US011874379B2

(12) United States Patent
Hollmann

(10) Patent No.: US 11,874,379 B2
(45) Date of Patent: *Jan. 16, 2024

(54) TIME-RESOLVED CONTRAST IMAGING FOR LIDAR

(71) Applicant: The Charles Stark Draper Laboratory, Inc., Cambridge, MA (US)

(72) Inventor: Joseph Hollmann, Watertown, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/049,614

(22) Filed: Oct. 25, 2022

(65) Prior Publication Data

US 2023/0075271 A1 Mar. 9, 2023

Related U.S. Application Data

(63) Continuation of application No. 16/280,723, filed on Feb. 20, 2019, now Pat. No. 11,506,790.

(60) Provisional application No. 62/632,917, filed on Feb. 20, 2018.

(51) Int. Cl.
*G01S 17/89* (2020.01)
*G01S 7/4865* (2020.01)
*G01S 7/48* (2006.01)
*G01S 17/86* (2020.01)
*G01S 17/931* (2020.01)

(52) U.S. Cl.
CPC ............ *G01S 17/89* (2013.01); *G01S 7/4808* (2013.01); *G01S 7/4865* (2013.01); *G01S 17/86* (2020.01); *G01S 17/931* (2020.01)

(58) Field of Classification Search
None
See application file for complete search history.

(56) References Cited

U.S. PATENT DOCUMENTS

| 7,009,690 B2 | 3/2006 | Kamon et al. |
| 8,761,990 B2 | 6/2014 | Chrysanthakopoulos et al. |
| 2002/0126024 A1 | 9/2002 | Kaplan |
| 2006/0250497 A1 | 11/2006 | Inbar et al. |

(Continued)

FOREIGN PATENT DOCUMENTS

| JP | 2017195573 A | 10/2017 |
| WO | 2011107987 A1 | 9/2011 |

OTHER PUBLICATIONS

Van Der Schaaf, Modelling the Power Spectra of Natural Images: Statistics and Information, Vision Res., vol. 36, No. 17, pp. 2759-2770, 1996.

(Continued)

*Primary Examiner* — Yuqing Xiao
*Assistant Examiner* — Jempson Noel
(74) *Attorney, Agent, or Firm* — Brooks Kushman P.C.

(57) ABSTRACT

A system and method of LIDAR imaging to overcome scattering effects pulses a scene with light pulse sequences from a light source. Reflected light from the scene is measured for each light pulse to form a sequence of time-resolved signals. Time-resolved contrast is calculated for each location in a scene. A three-dimensional map or image of the scene is created from the time-resolved contrasts. The three-dimensional map is then utilized to affect operation of a vehicle.

20 Claims, 6 Drawing Sheets

(56) References Cited

U.S. PATENT DOCUMENTS

| | | | |
|---|---|---|---|
| 2017/0234976 A1 | 8/2017 | Grauer et al. | |
| 2018/0347978 A1* | 12/2018 | Sánchez | G01S 17/89 |
| 2018/0372496 A1 | 12/2018 | Laine et al. | |
| 2019/0037120 A1 | 1/2019 | Ohki | |
| 2019/0179140 A1 | 6/2019 | Oba et al. | |
| 2019/0241114 A1* | 8/2019 | Satat | B60Q 1/085 |

OTHER PUBLICATIONS

Yu, Regularized Speckle Reducing Anisotropic Diffusion for Feature Characterization, International Conference on Image Processing (ICIP), Oct. 8-11, 2006, pp. 1577-1580.

International Search Report and Written Opinion re App. No. PCT/US2019/018784 dated May 20, 2019.

* cited by examiner

TIME-RESOLVED CONTRAST IMAGING FOR LIDAR

CROSS-REFERENCE TO RELATED APPLICATIONS

This application is a continuation of U.S. application Ser. No. 16/280,723 filed Feb. 20, 2019, now allowed, which, in turn, claims the benefit of U.S. provisional application Ser. No. 62/632,917 filed Feb. 20, 2018, the disclosures of which are hereby incorporated in their entirety by reference herein.

TECHNICAL FIELD

The present invention relates to light detection and ranging (LIDAR) three-dimensional imaging, particularly for use in scattering environments, and more particularly for use with autonomous and non-autonomous vehicles.

BACKGROUND

The demand for LIDAR imaging solutions has increased with the advent of autonomous vehicles and drones. LIDAR uses a pulsed laser or light-emitting diode (LED) beam to probe the distance to a reflector by measuring the time it takes for the light to be reflected back to the device. This allows for very precise measurements of a given environment. However, the small wavelength of light means that conventional LIDAR systems fail in conditions such as rain, fog, or smoke. This is because the pulsed laser or LED light is scattered by rain drops, smoke, sand, or other scatterers. Even though most of the light is scattered in the forward direction, some of it reflects back toward the LIDAR sensor. As a result, the LIDAR sensor provides a false reading representing the distance to the droplet or smoke particle, not to the object behind it.

To address the scattering problem, time filtering of LIDAR return signals has been tried to remove the effect of early scattered photons (time-gated LIDAR). In time-gated LIDAR, the return light signal is only analyzed in gated intervals to reduce effects from intervening scatter. Scattered photons are removed to the extent they arrive in the period between gated intervals. However, this technique is time consuming, provides lower resolution, and cannot operate in challenging environmental conditions. Improved high-resolution sensing techniques that can be effectively used in challenging environmental conditions and that are fast enough to be used in autonomous vehicles are needed.

SUMMARY

The deficiencies of the prior art are remedied by a LIDAR system and method that can be effectively used in vehicles such as, but not limited to, cars, trucks, autonomous vehicles, drones, planes, trains, and ships under challenging environmental conditions. In accordance with one embodiment of the invention, a LIDAR system is provided comprising a laser or LED light source, transmitter optics, and receiver optics. The system is arranged to produce a sequence of light pulses from the light source. The transmitter optics directs the light pulses from the source toward a scene. Light reflected from the scene in a time period between pulses is received in the receiver optics. The optics converts the light into a time-resolved signal for reflected light produced by each of the light pulses. An integrated circuit, such as may be found in a computer processer or an application-specific integrated circuit (ASIC), is configured to calculate a time-resolved contrast over the plurality of time-resolved signals produced by the plurality of light pulses in near real-time.

By producing a time-resolved contrast for each location in the scene, during a scanning process, a contrast image can be created for the entire scene. Objects that would be otherwise obscured due to scatter from environmental inferences such as fog, rain, sand, or smoke are made visible in the contrast image. Indeed, the time resolution provides a three-dimensional image or map and permits detection of the distance to an object.

In an embodiment of the invention, contrast is calculated by dividing the standard deviation of signals at a given time position across each of the plurality of time-resolved signals by the mean of the signals at the given time position across each of the plurality of time-resolved signals. Alternatively, contrast can be calculated by dividing the square of the standard deviation by the square of the mean. Further, a correction for shot noise can be achieved by calculating the difference of the square of the standard deviation and the mean, and dividing the difference by the square of the mean. The time position of the absolute maximum or absolute minimum of the time-resolved contrast may then correspond to the distance to an object. In an embodiment, these calculations may take place in a sliding window on the time-resolved signals to reduce the number of calculations necessary.

In some embodiments, the transmitter optics may be arranged to spread the light pulses so as to flood-illuminate the scene, a process known as flash LIDAR.

In accordance with a corresponding method embodiment of the invention, a process is repeated at each of a plurality of locations in the scene being scanned. A sequence of light pulses is transmitted toward a given location. Between consecutive pulses, reflected light is received from the scene in the time period between the pulses to produce a time-resolved signal. Contrast over a plurality of the time-resolved signals is calculated to produce a time-resolved contrast signal for the given location. Repeating the process at all locations in a scene produces time-resolved contrast signals throughout the scene. These may be used to determine distance to objects in the scene, to create a three-dimensional map of the scene, or to provide an image in which objects in the scene are visible despite scattering effects due to environmental factors or other scatterers. Instructions for this calculation may reside in a program code in a computer processor, or alternatively, may be implemented in an ASIC or other dedicated processor.

In accordance with an alternative embodiment of the invention, light pulses are transmitted at each of a plurality of locations in the scene to be scanned. A sensor receives reflected light from the scene in a time period between pulses. The sensor produces a signal as a function of time for the light pulse transmitted to each location. For each given location, time-resolved contrast is calculated over a plurality of signals produced for locations in a vicinity of the given location. To produce a time-resolved contrast image for the scene, the LIDAR system scans the scene, typically in a raster scan. Each location is oriented at a pan angle and a tilt angle relative to the LIDAR system.

The time-resolved contrast calculations involve calculating a standard deviation of the signals at a given time position produced for locations in the vicinity of a given location. A mean is calculated for the signals at the given time position produced for the locations in the vicinity of the given location . The time-resolved contrast is the standard deviation divided by the mean or, alternatively, the square of the standard deviation divided by the square of the mean. This is repeated for all the given locations in the scene. As with the other described embodiments, objects in the scene may be detected and/or distances to an object can be determined from the time-resolved contrast. A three-dimensional map and/or image of the scene may also be created. Optionally, flash LIDAR may be used with this method as well.

BRIEF DESCRIPTION OF THE DRAWINGS

The foregoing features of embodiments will be more readily understood by reference to the following detailed description, taken with reference to the accompanying drawings, in which.

DETAILED DESCRIPTION

Definitions. As used in this description and the accompanying claims, the following term shall have the meaning indicated, unless the context otherwise requires:

Vehicle: any manned or unmanned vehicle such as, but not limited to, cars, trucks, autonomous vehicles, rovers, unmanned ground vehicles (UGVs), unmanned aerial vehicles (UAVs), drones, aircraft, spacecraft, rail-based vehicles, trains, boats, ships, unmanned surface vehicles (USVs), unmanned underwater vehicles (UUVs).

Figure 1:
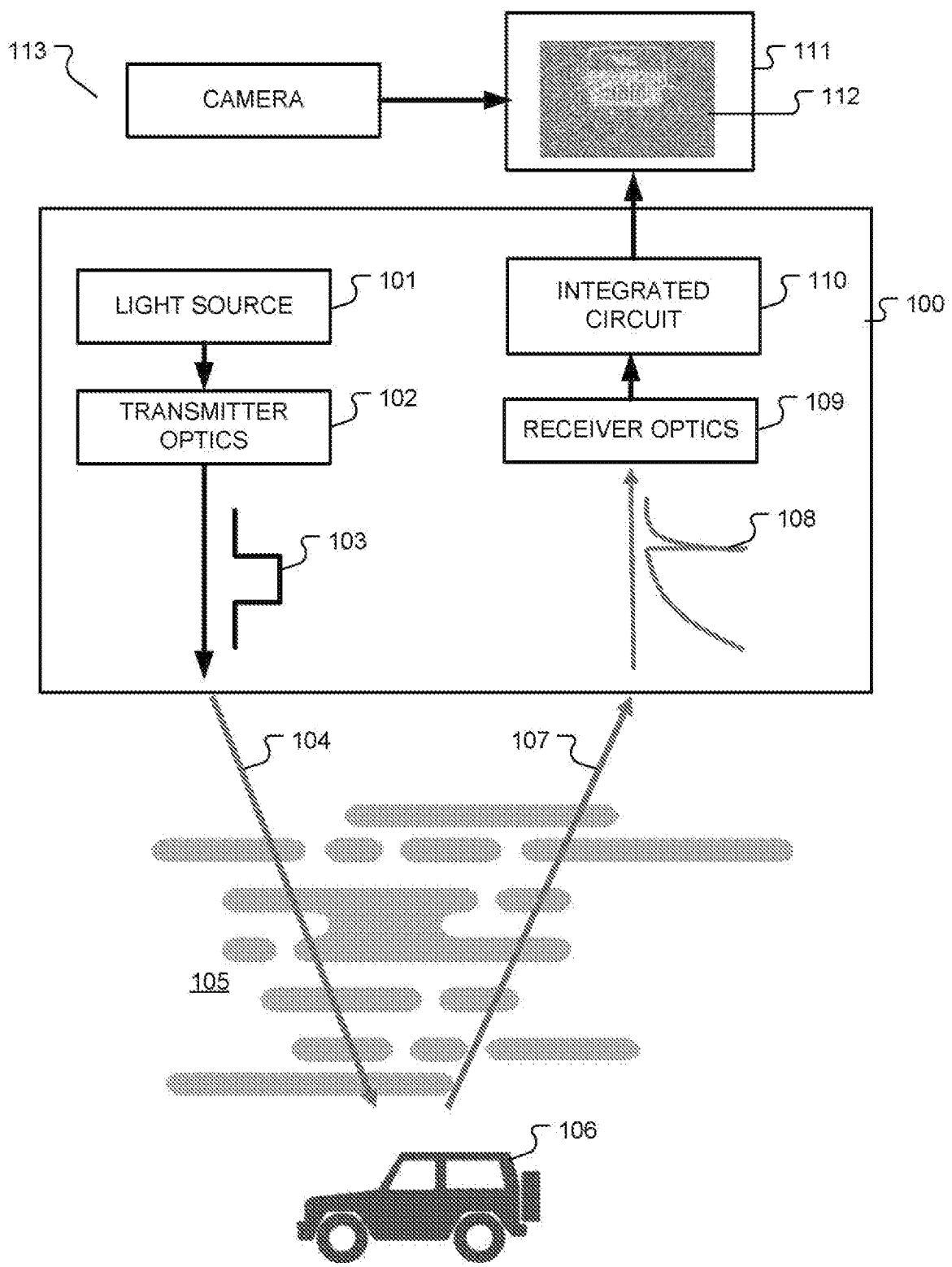
FIG. 1 shows a typical environment for embodiments of the present invention.

FIG. 1 depicts a LIDAR system in a typical environment for embodiments of the present invention. LIDAR system 100 may be used in a vehicle. The LIDAR system 100 may comprise a light source 101 and transmitter optics 102. Exemplarily, the light source 101 may be a laser or it may be a light-emitting diode (LED). The light source 101 may emit pulsed light directed at a scene. The transmitter optics 102 allows the LIDAR system 100 to steer the output of the light source 101 toward a desired location. The output of the transmitter optics 102 is a pulsed light beam 103 that is directed at a location in the scene. For example, the location could be a scanning location in the scene. The scanning location may be determined such that the entire scene can be scanned using N scanning locations. Alternatively, the transmitter optics 102 may be configured to spread the output of the light source 101 so as to flood-illuminate the whole scene.

For example, the pulsed light beam 103 may be directed at an object 106 that is in view of the LIDAR system 100. The pulsed light beam 103 may travel along transmission path 104 toward the object 106. Ideally, the transmission path 104 would be clear dry air, but in reality the transmission path 104 may be obscured by optical scatterers 105, including, but not limited to, fog, rain, smoke, or sand. The object 106 may be located behind the optical scatterers 105 and may therefore not be easily visible to the naked eye or to a LIDAR system as known in the prior art.

The pulsed light beam 103 traveling along the path transmission 104 may be reflected by any number of the optical scatterers 105 (reflection not shown) and/or off the object 106. When reflected off the object 106, the light may travel back to the LIDAR system 100 along reflection path 107. Again, ideally the reflection path 107 would be clear dry air, but it may be obscured by optical scatterers 105. The portion of the light not obscured by optical scatterers 105 reaches the LIDAR system 100 as reflected light 108. Receiver optics 109, arranged to receive and detect the reflected light 108 from the scene, may then produce a time-resolved signal in accordance with the intensity and timing of the reflected light 108. Since the light beam 103 is pulsed, the receiver optics 109 may be configured to receive the reflected light 108 in a time period between light pulses. The receiver optics 109 may also use an optical filter to isolate light from the pulsed source 101. The plurality of time-resolved signals may then be passed on to an integrated circuit 110.

The integrated circuit 110 may be part of the LIDAR system 100. The integrated circuit 110 may be configured to calculate a time-resolved contrast for each of the plurality of time-resolved signals received from the receiver optics 109 to determine the distance to the target from the time position of an absolute maximum or minimum along the time-resolved contrast. Exemplarily, the integrated circuit 110 may be an application-specific integrated circuit (ASIC) or it may be a processor including program code. The integrated circuit 110 may also be any other kind of circuit configured to calculate a time-resolved contrast in accordance with the embodiments of this invention as described in more detail in reference to FIGS. 2-6. The scanning process may be repeated N times for N scanning locations in the scene.

The LIDAR system 100 may further comprise an integrated circuit configured to generate a three-dimensional map of the scene from a plurality of time-resolved contrasts, such as the time-resolved contrasts corresponding to the N scanning locations. This integrated circuit may be the same as the integrated circuit 110, or it may be a different integrated circuit (not shown). Types of integrated circuits contemplated include , but are not limited to, ASICs or processors including program code. The integrated circuit may receive a plurality of time-resolved contrasts corresponding to a plurality of locations in the scene (e.g., the N scanning locations). From the time-resolved contrast for each scanning location, the integrated circuit may generate a three-dimensional map of the scene. Exemplarily, the integrated circuit may detect the time position of the absolute maximum or minimum of the time-resolved contrast. The time position at the maximum or minimum corresponds to the distance to an object at the location in the scene corresponding to that time-resolved contrast. The integrated circuit may then generate a three-dimensional map from the detected distances.

Exemplarily, the three-dimensional map of the scene may be utilized to affect the operation of an autonomous vehicle as known to a person having skill in the art and, for example, described in U.S. Pat. No. 8,761,990, which is incorporated herein by reference in its entirety. Alternatively, the three-dimensional map of the scene may be utilized to aid a driver of a vehicle with driving in challenging environmental conditions. A display 111 may be coupled to the LIDAR system 100. The display 111 may also be coupled to a camera 113. The display 111 may show a visual image produced by the camera 113. The visual image may, for example, be a real-time visual image of the road in front of the vehicle. The display 111 may further be configured to superimpose the three-dimensional map generated by the LIDAR system 100 on the visual image produced by the camera 113. The superimposition 112 of the visual image and the three-dimensional map may help the driver of the vehicle detect objects in front of the vehicle. For example, the superimposition 112 may show grey fog as recorded by the camera 113 superimposed with a three-dimensional LIDAR map depicting an outline of an oncoming vehicle.

Figure 2:
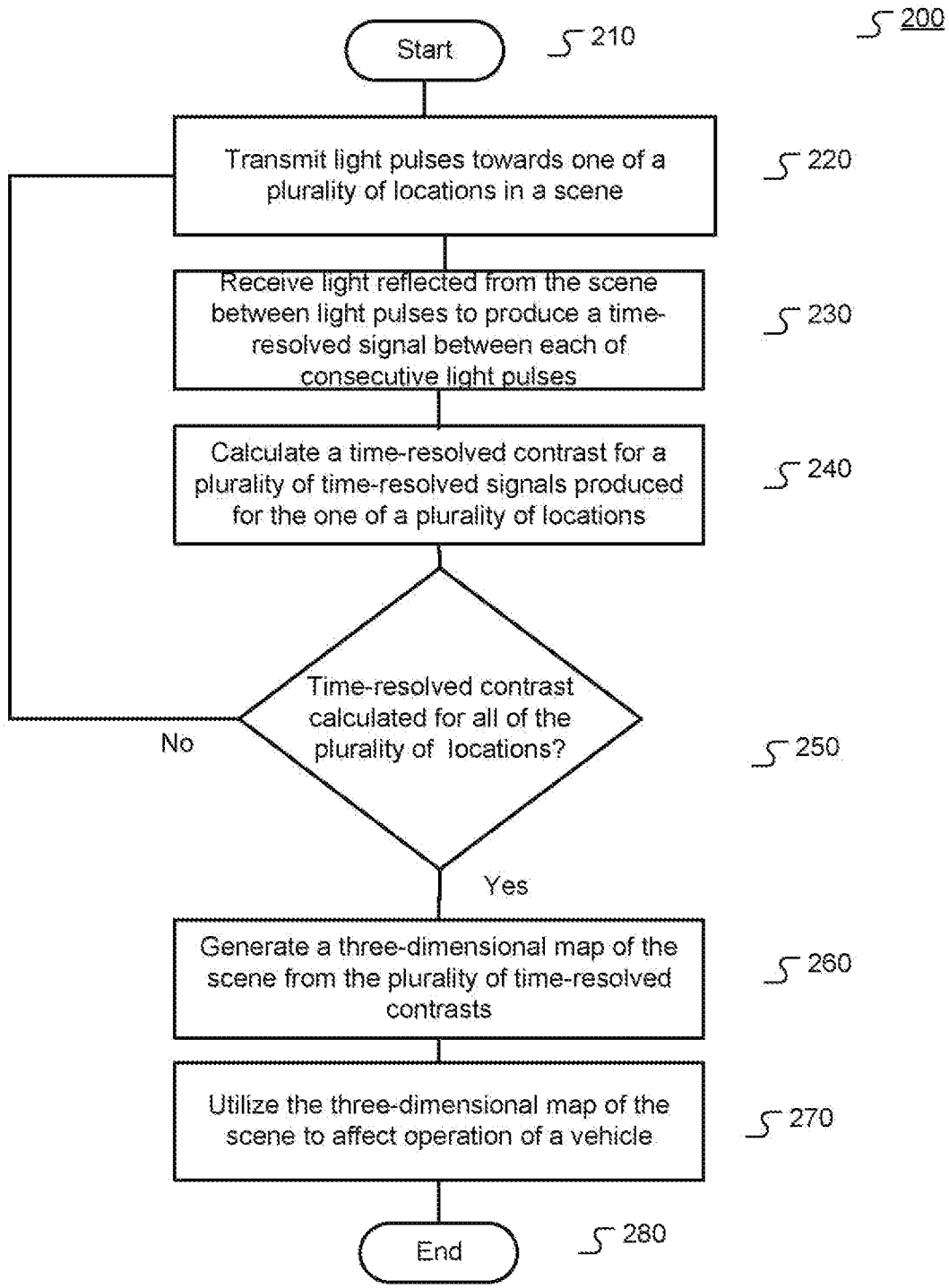
FIG. 2 shows various logical steps in a method for operating a LIDAR system in a vehicle to overcome scattering effects according to an embodiment of the present invention.

FIG. 2 shows various logical steps in a method 200 for operating a LIDAR system 100 in a vehicle to overcome scattering effects according to an embodiment of the present invention. Specifically, the procedure starts at step 210 and proceeds to step 220 where a sequence of light pulses are transmitted towards one of a plurality of locations in a scene (e.g., one of the N scanning locations). The light pulses may originate from a light source 101, including, but not limited to, a laser or an LED light source. The light pulses may further be transmitted by transmitter optics 102 which may direct the light pulses towards a predetermined location. The transmitter optics 102 may alternatively spread the light pulses so as to flash-illuminate the whole scene.

The method then proceeds to step 230 where light reflected from the scene is received. The reflected light may be received by receiver optics 109. More specifically, the receiver optics 109 may receive the reflected light in time period between light pulses to produce a time-resolved signal between each of consecutive light pulses. The plurality of time-resolved signals produced by the receiver optics 109 for the one location is then passed on to an integrated circuit 110.

In step 240, the integrated circuit 110 calculates a time-resolved contrast for the one of a plurality of locations (e.g., one of the N scanning locations) from the plurality of time-resolved signals for that location as received from the receiver optics 109. Types of integrated circuits contemplated include, but are not limited to, ASICs or computer processors including instructions for calculating the time-resolved contrast. The integrated circuit 110 may calculate the time-resolved contrast as described in detail below in reference to FIGS. 3 and 4.

The procedure moves on to step 250 where the LIDAR system 100 determines whether a time-resolved contrast has been calculated for each one of the plurality of locations (e.g., each one of the N scanning locations in a scene). If a time-resolved contrast has not been calculated for all locations, the procedure goes back to step 220 to calculate the time- resolved contrast for another one of the plurality of locations. If a time-resolved contrast has been calculated for all locations, the procedure moves on to step 260.

At step 260, the LIDAR system 100 generates a three-dimensional map of the scene from the plurality of time-resolved contrasts calculated for the plurality of locations. The map may be generated by the integrated circuit 110, or it may be generated by another integrated circuit. The map may, for example, be generated by detecting the time position of the absolute maximum or minimum of each time-resolved contrast. The time position at the maximum or minimum corresponds to the distance to an object at the location in the scene corresponding to that time-resolved contrast. Having calculated such distance for each location in a scene, the LIDAR system 100 may detect an object in the scene from the distances as reflected in the three-dimensional map of the scene.

The procedure then moves on to step 270 where the generated three-dimensional map is utilized to affect operation of the vehicle. The utilizing may comprise displaying the generated map on a display 111 superimposed on a visual image produced by a camera 113. The superimposition 112 may aid a driver of a vehicle in recognizing objects in front of the vehicle that would otherwise be invisible due to challenging environmental conditions. For example, the superimposition 112 may allow the driver to see an oncoming vehicle in dense fog. The utilizing may further comprise using the generated three-dimensional map to affect the operation of an autonomous vehicle as known to a person having skill in the art and, for example, contemplated in U.S. Pat. No. 8,761,990. The procedure then ends at step 280.

Figure 3:
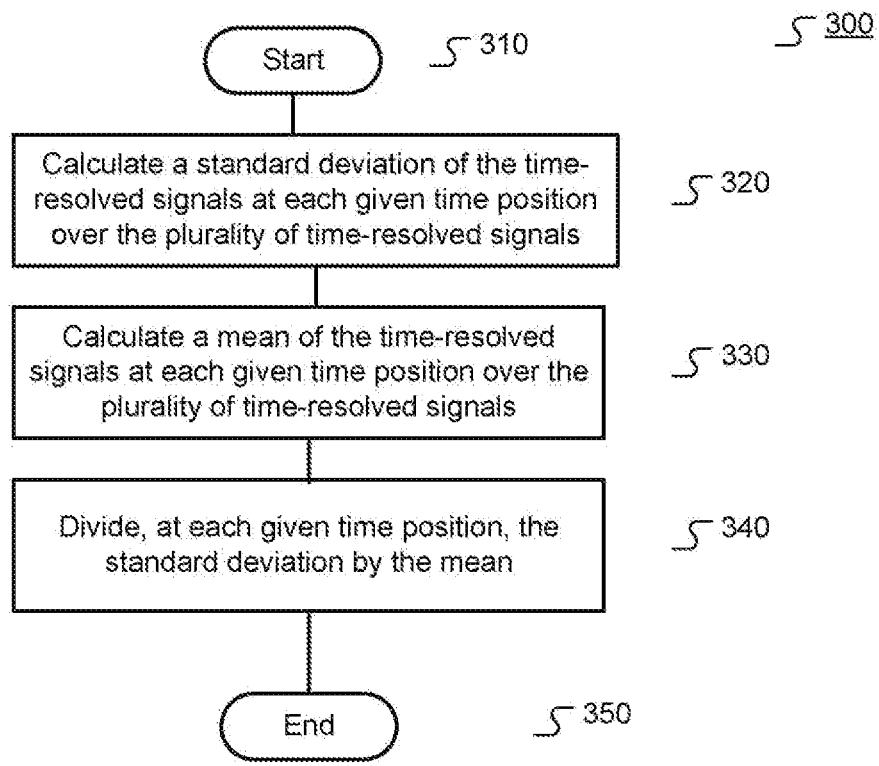
FIG. 3 shows various logical steps in a method for time-resolved contrast LIDAR imaging according to an embodiment of the present invention.

FIG. 3 shows various logical steps in method 300 for calculating time-resolved contrast in accordance with an embodiment of this invention. The procedure starts at step 310 and moves on to step 320 where the integrated circuit 110 calculates a standard deviation of the time-resolved signals at each given time position over the plurality of time-resolved signals received from the receiver optics 109. At step 330, the integrated circuit 110 calculates a mean of the time-resolved signals at each given time position over the plurality of time-resolved signals. The method proceeds to step 340 where the integrated circuit 110 divides, at each given time position, the standard deviation of the time-resolved signals by the mean of the time-resolved signals. The result of this division is the time-resolved contrast. The procedure ends at step 350. While FIG. 3 depicts calculating the standard deviation and mean, the integrated circuit 110 may alternatively calculate the square of the standard deviation and divide it by the square of the mean. Further , while FIG. 3 shows calculations on the entire time-resolved signal, it is expressly contemplated that the calculations may be performed on a sliding time window on each of the plurality of time-resolved signals. This may reduce the number of calculations needed to determine the time position of the absolute maximum or minimum of the time-resolved contrast at a given location by taking into account the time positions of the absolute maxima or minima in the vicinity of the given location. For example, instead of performing calculations for all time positions, the integrated circuit 110 may only calculate the time-resolved contrast in a limited time window corresponding to the time position of the absolute maximum or minimum of the time-resolved contrast in the vicinity of the given location.

Figure 4:
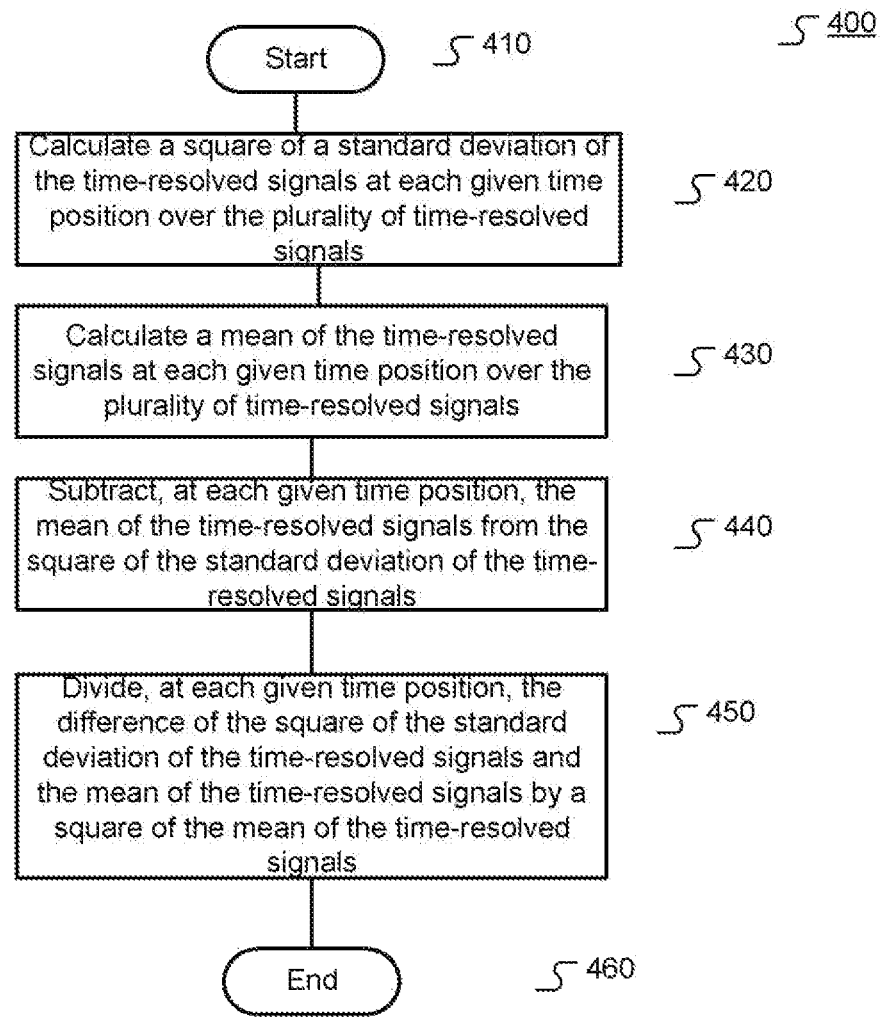
FIG. 4 shows various logical steps in a method for time-resolved contrast LIDAR imaging with shot noise correction according to an embodiment of the present invention.

FIG. 4 shows various logical steps in method 400 for calculating time-resolved contrast corrected for shot noise in accordance with an alternative embodiment of this invention. Shot noise is associated with the particle nature of light and describes the fluctuations of the number of photons detected due to their occurrence independent of each other, causing fluctuations in amplitude of the time-resolved signals. The procedure starts at step 410 and moves on to step 420 where the integrated circuit 110 calculates a square of a standard deviation of the time-resolved signals at each given time position over the plurality of time-resolved signals received from the receiver optics 109.

The method then proceeds to step 430 where the integrated circuit 110 calculates a mean of the time-resolved signals at each given time position over the plurality of time-resolved signals. At step 440, the integrated circuit 110 subtracts, at each given time position, the mean of the time-resolved signals from the square of the standard deviation of the time-resolved signals to correct for shot noise.

At step 450, the integrated circuit 110 divides, at each given time position, the difference of the square of the standard deviation of the time-resolved signals and the mean of the time-resolved signals by a square of the mean of the time-resolved signals. The result of this division is the time-resolved contrast. The procedure ends at step 460. While FIG. 4 depicts calculating the square of the standard deviation and the square of the mean, the integrated circuit 110 may alternatively calculate the standard deviation and divide it by the mean. Further, while FIG. 4 shows calculations on the entire time-resolved signal, it is expressly contemplated that the calculations may be performed on a sliding time window on each of the plurality of time-resolved signals. This may reduce the number of calculations required as described above in reference to FIG. 3.

Figure 5:
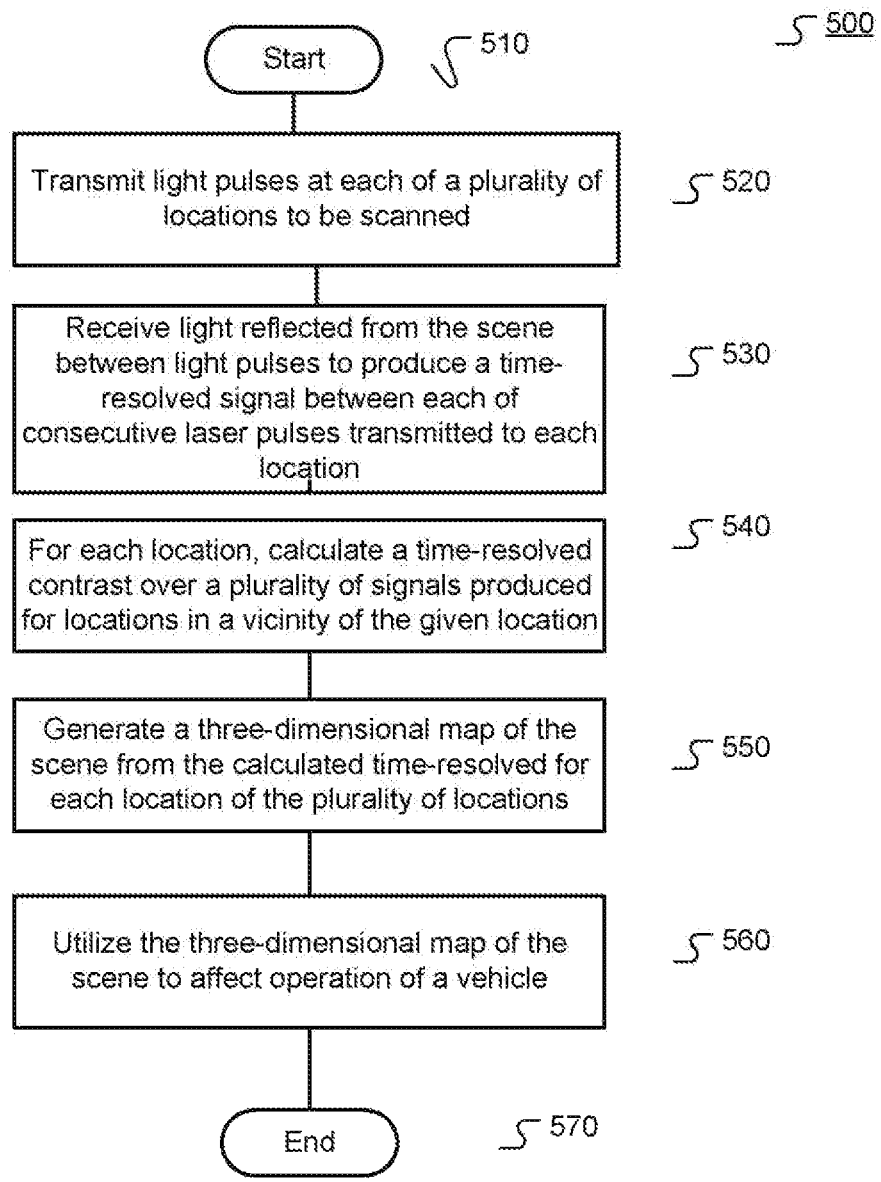
FIG. 5 shows various logical steps in a method for time-resolved contrast LIDAR imaging according to an alternative embodiment of the present invention.

FIG. 5 depicts various logical steps in method 500 for operating a LIDAR system in a vehicle to overcome scattering effects in accordance with an alternative embodiment of this invention. The procedure starts at step 510 and moves on to step 520 where transmitter optics 102 coupled to the vehicle transmit light pulses at each of a plurality of locations in a scene to be scanned (e.g., N scanning locations). The LIDAR system 100 may typically scan the scene in a raster scan so that each location is oriented at a pan angle and a tilt angle relative to the LIDAR system 100 and so that locations in the vicinity of a given location can be easily identified. The light pulses may originate from a light source 101, including, but not limited to, a laser or an LED light source. The light pulses may be directed by transmitter optics 102 toward the location (e.g., one of the N scanning locations) in the scene. The transmitter optics 102 may alternatively spread the light pulses so as to flash-illuminate the whole scene.

The method proceeds to step 530 where receiver optics 109 coupled to the vehicle receive and detect light reflected from the scene in a time period between light pulses. The receiver optics 109 thereby produces a time-resolved signal for each of the plurality of locations (e.g., each one of the N scanning locations). Proceeding to step 540, the method calculates, by an integrated circuit 110, a time-resolved contrast over the time-resolved signals produced for locations in the vicinity of a selected one of the plurality of locations. The integrated circuit 110 may be an ASIC or a processor including program code. The integrated circuit 110 may also be any other circuit configured to perform the calculations. The calculations are described in further detail below in reference to FIG. 6 and are repeated for each one of the plurality of locations (e.g., for each one of the N scanning locations).

The procedure then moves on to step 550 where the integrated circuit 110, or another integrated circuit, generates a three-dimensional map of the scene from the calculated time-resolved contrast for each location of the plurality of locations. The map may, for example, be generated by detecting the time position of the absolute maximum or minimum of each time-resolved contrast. The time position at the maximum or minimum corresponds to the distance to an object at the location in the scene corresponding to that time-resolved contrast. At step 560, the generated three-dimensional map is utilized to affect the operation of the vehicle. The utilizing may comprise displaying the generated map on a display 111 superimposed on a visual image produced by a camera 113. The superimposition 112 may aid a driver of the vehicle in recognizing objects in front of the vehicle that would otherwise be invisible due to challenging environmental conditions. For example, the superimposition 112 may allow the driver to see an oncoming vehicle in dense fog. The utilizing may further comprise using the generated three-dimensional map to affect the operation of an autonomous vehicle as known to a person having skill in the art and, for example, contemplated in U.S. Pat. No. 8,761,990. The procedure then ends at step 570.

Figure 6:
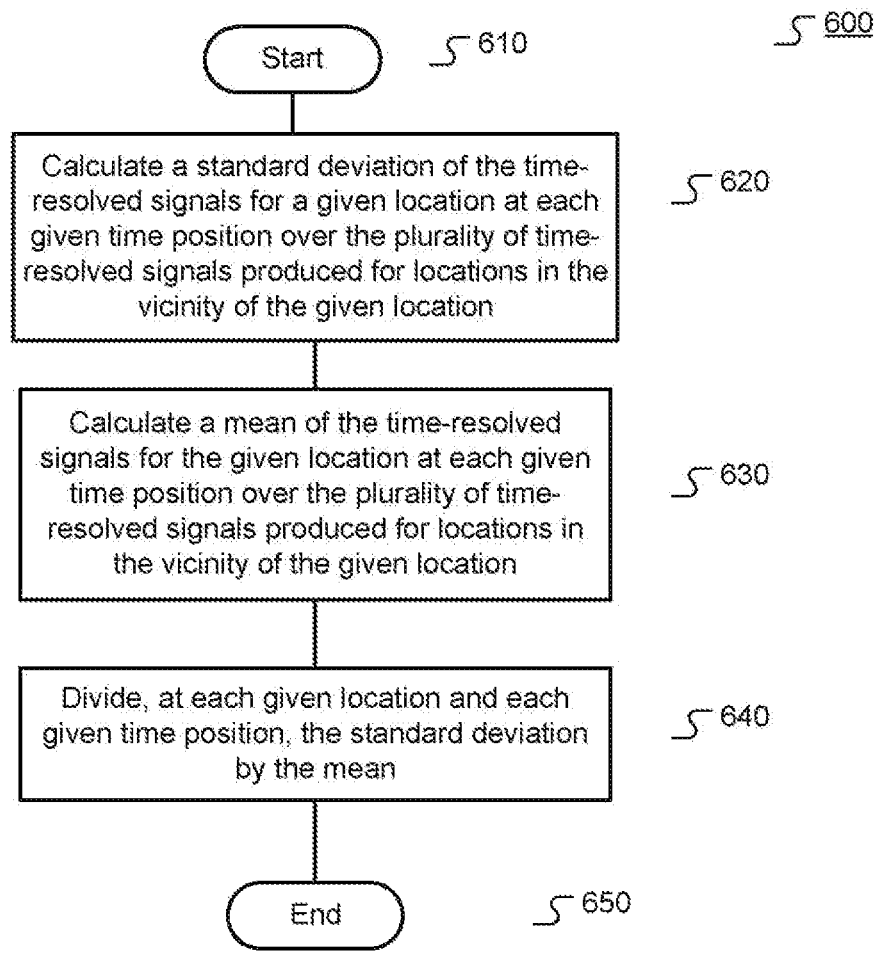
FIG. 6 shows various logical steps in a method for time-resolved contrast LIDAR imaging according to an alternative embodiment of the present invention.

FIG. 6 shows various logical steps in method 600 for calculating time-resolved contrast at a given location in accordance with an alternative embodiment of this invention. The procedure starts at step 610 and moves on to step 620 where the integrated circuit 110 calculates a standard deviation at each given time position over the plurality of time-resolved signals produced by the receiver optics 109 for locations in the vicinity of the given location. At step 630, the integrated circuit 110 calculates a mean at each given time position over the plurality of time-resolved signals produced for locations in the vicinity of the given location. The method proceeds to step 640 where the integrated circuit 110 divides, at each given time position, the standard deviation by the mean. The result of this division is the time-resolved contrast for the given location. The procedure ends at step 650. While FIG. 6 depicts calculating the standard deviation and mean, the integrated circuit 110 may alternatively calculate the square of the standard deviation and divide it by the square of the mean. The integrated circuit may also perform shot noise correction as described above in reference to FIG. 4. Further, while FIG. 6 shows calculations on the entire time-resolved signal, it is expressly contemplated that the calculations may be performed on a sliding time window on each of the plurality of time-resolved signals to reduce the number of calculations required as described above in reference to FIG. 3.

Embodiments of the invention may be implemented in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in part as a computer program product for use with a computer system. Such implementation may include a series of computer instructions fixed either on a tangible medium, such as a computer-readable medium (e.g., a diskette, CD-ROM, DVD-ROM, ROM, or fixed disk) or transmittable to a computer system via a modem or other interface device, such as a communications adapter connected to a network over a medium. The medium may be a tangible medium (e.g., optical, digital, or analog communications lines) and the serious of computer instructions embodies all or part of the functionality previously described herein with respect to the system and methods. Those skilled in the art should appreciate that such computer instructions can be written in a number of programming languages for use with many computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server or electronic bulletin board over the network (e.g., the Internet or World Wide Web). Some embodiments of the invention may be implemented as a combination of both software and hardware. Still other embodiments may be implemented as entirely hardware or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A light detection and ranging (LIDAR) system comprising:
a source of light pulses;
transmitter optics configured to direct a sequence of light pulses from the source toward a scene;
receiver optics arranged to receive light reflected from the scene in a time period between light pulses and to provide a time-resolved signal of the reflected light produced by each of a plurality of the light pulses; and
an integrated circuit configured to calculate a time-resolved contrast over a time window of the plurality of time-resolved signals, the time window corresponding to a time position of the absolute maximum or minimum of the time-resolved contrast.

2. The LIDAR system of claim 1, wherein the time-resolved contrast corresponds to a standard deviation of the time-resolved signals at a given time position of the time window of the plurality of time-resolved signals divided by a mean of the time-resolved signals at the given time position of the time window of the plurality of time-resolved signals.

3. The LIDAR system of claim 1, wherein the time-resolved contrast corresponds to a difference of a square of a standard deviation of time-resolved signals at a given time position of the time window of the plurality of time-resolved signals and a mean of the time-resolved signals at the given time position of the time window of the plurality of time-resolved signals, the difference further divided by a square of the mean.

4. The LIDAR system of claim 1, wherein the integrated circuit comprises a processor including program code with instructions for calculating the time-resolved contrast.

5. The LIDAR system of claim 1, wherein the integrated circuit is an application-specific integrated circuit (ASIC).

6. The LIDAR system of claim 1, wherein the transmitter optics are configured to spread the light pulses to flood-illuminate the scene.

7. The LIDAR system of claim 1, wherein the source of light pulses is a laser or a light-emitting diode (LED).

8. The LIDAR system of claim 1, further comprising a second integrated circuit configured to generate a three-dimensional map of the scene from a plurality of the time-resolved contrasts.

9. The LIDAR system of claim 8, further comprising:
a camera configured to produce a visual image of the scene; and
a display configured to display the three-dimensional map of the scene superimposed on the visual image of the scene.

10. The LIDAR system of claim 1, wherein the integrated circuit is further configured to generate a three-dimensional map of the scene from a plurality of the time-resolved contrasts.

11. A method for operating a LIDAR system in a vehicle to overcome scattering effects, the method comprising:

(a) transmitting, by transmitter optics, a sequence of light pulses towards one of a plurality of locations in a scene to be scanned;
(b) receiving, by receiver optics, light reflected from the scene in a time period between light pulses to produce a time-resolved signal between each of consecutive light pulses;
(c) calculating, by an integrated circuit, a time-resolved contrast over a time window of the plurality of time-resolved signals produced by the plurality of light pulses, the time window corresponding to a time position of the absolute maximum or minimum of the time-resolved contrast in the vicinity of the one of the plurality of locations;
(d) repeating (a) through (c) for each of the remainder of the plurality of locations in the scene to be scanned;
(e) generating a three-dimensional map of the scene from the plurality of time-resolved contrasts for the plurality of locations; and
(f) utilizing the three-dimensional map of the scene to affect operation of the vehicle.

12. The method of claim 11, wherein the calculating further comprises:
(i) calculating, by the integrated circuit, a standard deviation of the plurality of time-resolved signals over the time window;
(ii) calculating, by the integrated circuit, a mean of the plurality of time-resolved signals over the time window; and
(iii) dividing, by the integrated circuit, over the time window, the standard deviation by the mean.

13. The method of claim 11, wherein the calculating further comprises:
(i) calculating, by the integrated circuit, a square of a standard deviation of the plurality of time-resolved signals over the time window;
(ii) calculating, by the integrated circuit, a mean of the plurality of time-resolved signals over the time window;
(iii) subtracting, by the integrated circuit, at each given time position the mean of the plurality of time-resolved signals from the square of the standard deviation of the plurality of time-resolved signals; and
(iv) dividing, by the integrated circuit, over the time window, the difference of the square of the standard deviation of the plurality of time-resolved signals and the mean of the plurality of time-resolved signals by a square of the mean of the plurality of time-resolved signals.

14. The method of claim 13, where $\alpha_x$ and $\alpha_y$, are angles corresponding to scanning of the LIDAR system, $\sigma(\alpha_x, \alpha_y, \tau)$ is the standard deviation of the plurality of time-resolved signals over the time window, $\mu(\alpha_x, \alpha_y, \tau)$ is the mean of the plurality of time-resolved signals over the time window, and $K(\tau)$ is a measure of angular and temporal speckle defined as $\sigma(\alpha_x, \alpha_y, \tau)/\mu(\alpha_x, \alpha_y, \tau)$.

15. The method of claim 11, further comprising utilizing the three-dimensional map to detect an object in the scene.

16. The method of claim 11, wherein the transmitting further comprises spreading the light pulses to flood-illuminate the scene.

17. The method of claim 11, wherein the light pulses are laser pulses or LED pulses.

18. The method of claim 11, further comprising capturing, by a camera, a visual image of the scene and superimposing the three-dimensional map of the scene on the visual image of the scene.

19. The method of claim 18, further comprising displaying the superimposition of the three-dimensional map of the scene and the visual image of the scene to a driver of the vehicle.

20. The method of claim 11, wherein the vehicle is an autonomous vehicle.

* * * * *